United States Patent
Lyu et al.

(10) Patent No.: US 12,094,137 B2
(45) Date of Patent: Sep. 17, 2024

(54) ACCELERATED ALIGNMENT OF HIGH-RESOLUTION IMAGE AND DEPTH MAP FOR LOW-BIT-WIDTH FLOATING-POINT REPRESENTATION

(71) Applicant: Ambarella International LP, Santa Clara, CA (US)

(72) Inventors: Sicong Lyu, Shanghai (CN); Liangliang Wang, Shanghai (CN); Bo Yu, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 398 days.

(21) Appl. No.: 17/568,843

(22) Filed: Jan. 5, 2022

(65) Prior Publication Data

US 2023/0206476 A1 Jun. 29, 2023

(30) Foreign Application Priority Data

Dec. 27, 2021 (CN) .......................... 202111612321.3

(51) Int. Cl.
*G06T 7/30* (2017.01)
*G06T 7/55* (2017.01)
*G06T 7/80* (2017.01)

(52) U.S. Cl.
CPC .................. *G06T 7/30* (2017.01); *G06T 7/55* (2017.01); *G06T 7/80* (2017.01); *G06T 2207/10016* (2013.01); *G06T 2207/10028* (2013.01); *G06T 2207/20021* (2013.01)

(58) Field of Classification Search
CPC .... G06T 7/30; G06T 7/55; G06T 7/80; G06T 2207/10016; G06T 2207/10028; G06T 2207/20021; G06T 5/70
See application file for complete search history.

(56) References Cited

U.S. PATENT DOCUMENTS

| | | | |
|---|---|---|---|
| 2017/0316602 A1* | 11/2017 | Smirnov | H04N 13/111 |
| 2022/0335637 A1* | 10/2022 | Price | G06T 5/73 |
| 2023/0153960 A1* | 5/2023 | Garg | G06T 5/10 |
| | | | 382/255 |

\* cited by examiner

*Primary Examiner* — Ping Y Hsieh
*Assistant Examiner* — Vaisali Rao Koppolu
(74) *Attorney, Agent, or Firm* — Maiorana Patent Law, PA

(57) ABSTRACT

An apparatus comprises an interface and a processor. The interface may be configured to receive pixel data. The processor may be configured to (i) process the pixel data arranged as video frames, (ii) decompose each of the video frames comprising a high-resolution two-dimensional (2D) image into a plurality of 2D sub-images using a decomposition offset, (iii) decompose each of the video frames comprising a high-resolution depth map image into a plurality of depth map sub-images using the decomposition offset, (iv) calculate a respective alignment matrix for each of the plurality of 2D sub-images and a corresponding one of the plurality of depth map sub-images using the decomposition offset, (v) perform matrix operations on the plurality of 2D sub-images and the plurality of depth map sub-images using the respective alignment matrices to obtain a plurality of aligned 2D sub-images and depth map sub-images, (v) determine projection coordinates and depth values of the plurality of aligned 2D sub-images and depth map sub-images based on the high-resolution 2D image, and (vi) generate an aligned high-resolution depth map using the projection coordinates and depth values.

20 Claims, 12 Drawing Sheets

FIG. 6

ACCELERATED ALIGNMENT OF HIGH-RESOLUTION IMAGE AND DEPTH MAP FOR LOW-BIT-WIDTH FLOATING-POINT REPRESENTATION

This application relates to Chinese Application No. 202111612321.3, filed Dec. 27, 2021, which is incorporated by reference in its entirety.

FIELD OF THE INVENTION

The invention relates to computer vision generally and, more particularly, to a method and/or apparatus for implementing accelerated alignment of high-resolution image and depth map for low-bit-width floating-point representation.

BACKGROUND

With the rapid development of machine vision, optical technology, and artificial intelligence, the application and research of various depth map images has become an important branch of machine vision. An important application of depth map image research is the alignment between a two-dimensional (2D) color (e.g., RGB) image and a depth map image generated using various techniques including time-of-flight (TOF), binocular stereo matching, monocular speckle structured light, and so on. However, there are still some problems in the existing method for alignment of high-resolution RGB images and high-resolution depth images, such as the speed is not fast enough, or the accuracy is not accurate enough after acceleration.

The depth-2D device is generally realized through an embedded system. Due to the limited number of mantissa bits of the floating-point arithmetic unit of many embedded processors, when the existing depth alignment algorithm for high-resolution images is implemented on the embedded platform, the resulting depth image will appear at a position with a larger pixel coordinate value. Thus, the resulting depth image cannot be accurately aligned with the 2D image. The existing solution to this problem is to switch to a processor with a larger floating-point mantissa. Doing so, either increases the cost of the device, or increases the time consumption of the algorithm and reduces the efficiency of the algorithm.

It would be desirable to implement accelerated alignment of high resolution image and depth map for low-bit-width floating-point representation.

SUMMARY

The invention encompasses an aspect concerning an apparatus comprising an interface and a processor. The interface may be configured to receive pixel data. The processor may be configured to (i) process the pixel data arranged as video frames, (ii) decompose each of the video frames comprising a high-resolution two-dimensional (2D) image into a plurality of 2D sub-images using a decomposition offset, (iii) decompose each of the video frames comprising a high-resolution depth map image into a plurality of depth map sub-images using the decomposition offset, (iv) calculate a respective alignment matrix for each of the plurality of 2D sub-images and a corresponding one of the plurality of depth map sub-images using the decomposition offset, (v) perform matrix operations on the plurality of 2D sub-images and the plurality of depth map sub-images using the respective alignment matrices to obtain a plurality of aligned 2D sub-images and depth map sub-images, (v) determine projection coordinates and depth values of the plurality of aligned 2D sub-images and depth map sub-images based on the high-resolution 2D image, and (vi) generate an aligned high-resolution depth map using the projection coordinates and depth values. The video frames generally have a pixel coordinate value greater than a number of bits supported by a floating-point operator of the processor. A size of the plurality of 2D and depth map sub-images is generally determined based on the floating-point operator of said processor.

In some embodiments of the apparatus aspect described above, the matrix decomposition offset is configured to ensure that each of the sub-images is represented as a low-bit floating-point representation without a loss of accuracy.

In some embodiments of the apparatus aspect described above, the processor may be configured to calculate the matrix decomposition offset based on a number of bits of a mantissa of the low-bit floating-point representation.

In some embodiments of the apparatus aspect described above, the high-resolution two-dimensional (2D) image and the high-resolution depth map image are generally divided into a plurality of rows and columns of sub-images based on the decomposition offset.

In some embodiments of the apparatus aspect described above, the processor may be further configured to calculate a respective camera matrix for each of the 2D sub-images and each of the depth map sub-images. In some embodiments where the processor calculates the respective camera matrices, the processor may be further configured to calculate a respective intermediate matrix for each of the corresponding 2D and depth map sub-images using the respective camera matrix for each corresponding 2D sub-image, the respective camera matrix for each corresponding depth map sub-image, and a camera projection matrix of the apparatus. In some embodiments, the processor may be further configured to calculate a respective disparity-to-depth matrix for each of the corresponding 2D and depth map sub-images using the intermediate matrix. In some embodiments, the processor may be further configured to generate an aligned high resolution depth map for the high resolution 2D image using the respective disparity-to-depth matrices for the corresponding 2D and depth map sub-images.

In some embodiments of the apparatus aspect described above, the processor generally comprises a plurality of hardware engines configured to perform the matrix operations.

In some embodiments of the apparatus aspect described above, the processor may comprise a system-on-chip.

The invention also encompasses an aspect concerning a method for accelerated alignment of 2D and depth images using a low-bit-width floating-point representation comprising (i) receiving pixel data, (ii) processing the pixel data arranged as video frames, (iii) decomposing each of the video frames comprising a high-resolution two-dimensional (2D) image into a plurality of 2D sub-images using a decomposition offset, (iv) decomposing each of the video frames comprising a high-resolution depth map image into a plurality of depth map sub-images using the decomposition offset, (v) calculating a respective alignment matrix for each of the plurality of 2D sub-images and a corresponding one of the plurality of depth map sub-images using the decomposition offset, (vi) performing matrix operations on the plurality of 2D sub-images and the plurality of depth map sub-images using the respective alignment matrices to obtain a plurality of aligned 2D sub-images and depth map sub-images, (vii) determining projection coordinates and depth values of the plurality of aligned 2D sub-images and depth map sub-images based on the high-resolution 2D image, and (viii) generating an aligned high-resolution depth map using the projection coordinates and depth values. The video frames generally have a pixel coordinate value greater than a number of bits supported by a floating-point operator of the processor and a size of the plurality of 2D and depth map sub-images may be determined based on the floating-point operator of the processor.

In some embodiments of the method aspect described above, the matrix decomposition offset may be configured to ensure that each of the sub-images is represented as a low-bit floating-point representation without a loss of accuracy.

In some embodiments of the method aspect described above, the method may further comprise calculating the matrix decomposition offset based on a number of bits of a mantissa of the low-bit floating-point representation.

In some embodiments of the method aspect described above, the high-resolution two-dimensional (2D) image and the high-resolution depth map image may be divided into a plurality of rows and columns of sub-images based on the decomposition offset.

In some embodiments of the method aspect described above, the method may further comprise calculating a respective camera matrix for each of the 2D sub-images and each of the depth map sub-images.

In some embodiments of the method aspect described above, the method may further comprise calculating a respective intermediate matrix for each of the corresponding 2D and depth map sub-images using the respective camera matrix for each corresponding 2D sub-image, the respective camera matrix for each corresponding depth map sub-image, and a camera projection matrix of the apparatus. In some embodiments, the method may further comprise calculating a respective disparity-to-depth matrix for each of the corresponding 2D and depth map sub-images using the intermediate matrix. In some embodiments, the method may further comprise generating an aligned high resolution depth map for the high resolution 2D image using the respective disparity-to-depth matrices for the corresponding 2D and depth map sub-images.

In some embodiments of the method aspect described above, the method may further comprise utilizing a plurality of hardware engines of a processor circuit to perform the matrix operations. In some embodiments, the processor circuit may be part of en edge device.

BRIEF DESCRIPTION OF THE FIGURES

Embodiments of the invention will be apparent from the following detailed description and the appended claims and drawings.

FIG. 6 is a diagram illustrating decomposition of high-resolution 2D and depth map images into sub-images, which may be used to calculate an alignment matrix using low-bit-width floating-point representation.

DETAILED DESCRIPTION OF THE EMBODIMENTS

Embodiments of the invention include providing accelerated alignment of high resolution image and depth map for low-bit-width floating-point representation that may (i) utilize a low-bit-width floating-point representation based on a matrix decomposition offset, (ii) decompose a high resolution 2D image and a high resolution depth map image into a number of rows and columns of uniform sub-images based on low-bit-width floating-point representation being used, (iii) perform alignment operations on corresponding 2D sub-images and depth sub-images to generate an aligned depth image, (iv) be implemented in edge devices, (v) use depth images based on time-of-flight, binocular stereo matching, monocular speckle pattern structured light, etc., (vi) maintain accuracy of high resolution 2D image and a high resolution depth map image alignment when using low-bit-width floating point representation, (vii) provide faster alignment, and/or (viii) be implemented as one or more integrated circuits.

In order to solve depth alignment of high-resolution images in a low-bit-width floating-point operation platform, the present invention designs and implements a depth alignment algorithm based on image splitting. The image splitting algorithm may eliminate a phenomenon of the existing technique that the depth image cannot be accurately aligned with the 2D image at the position where the pixel coordinate value is larger due to a too small bit-width of the floating-point operation platform. An accelerated implementation of high-resolution 2D image and high-resolution depth map image alignment based on a combination of matrix decomposition, migration, and table look-up. In various embodiments, the original high-resolution images are decomposed into several uniform small images, and an alignment matrix of several uniform small images is calculated by matrix decomposition offset to ensure that each decomposed image may be represented by low-bit-width representation without loss of accuracy. Then, several small images are used for matrix operations with the alignment matrix obtained by matrix decomposition offset and low-bit-width representation, respectively, and the coordinates and depth values of several of the small images are obtained, aligned based on the original high-resolution 2D image. Based on the coordinates and depth values, the data are searched to obtain the finally aligned high-resolution depth map.

Figure 1:
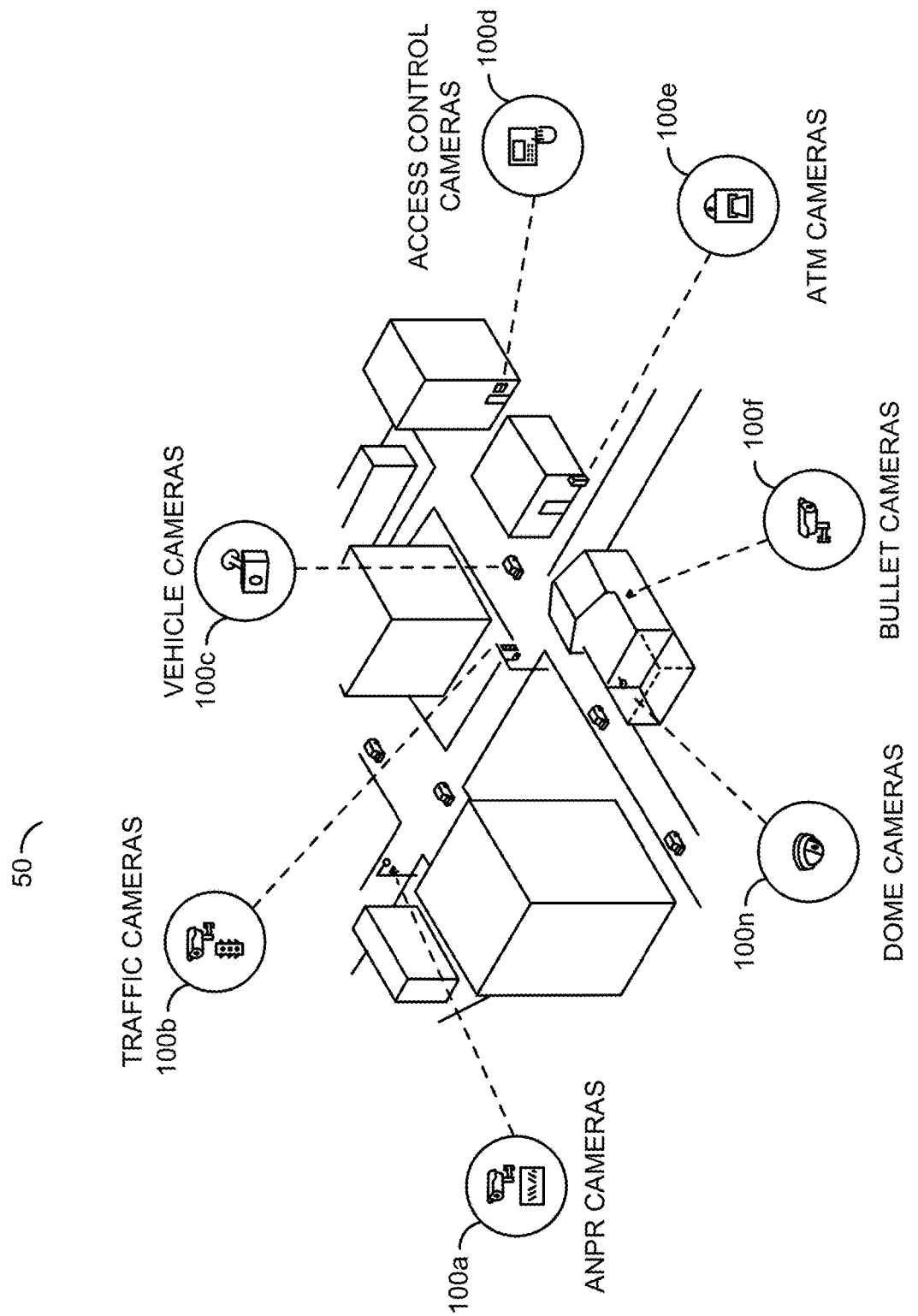
FIG. 1 is a diagram illustrating examples of edge devices that may utilize a processor configured to implement accelerated alignment of high-resolution image and depth map for low-bit-width floating-point representation in accordance with example embodiments of the invention.

Referring to FIG. 1, a diagram illustrating examples of edge devices that may implement accelerated alignment of high-resolution 2D and depth map images for low-bit-width floating-point representation in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may implement accelerated alignment of high-resolution 2D and depth map images for low-bit-width floating-point representation in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of accelerating alignment of high-resolution image and depth map for low-bit floating-point representation in accordance with embodiments of the invention. In an example, an edge device utilizing accelerated alignment of high-resolution 2D and depth map images for low-bit-width floating-point representation in accordance with an embodiment of the invention may take massive amounts of image data and make on-device inferences to obtain useful information (e.g., multiple time instances of images per network execution) with reduced bandwidth and/or reduced power consumption. The design, type, and/or application performed by the edge devices 100a-100n may be varied according to the design criteria of a particular implementation.

Figure 2:
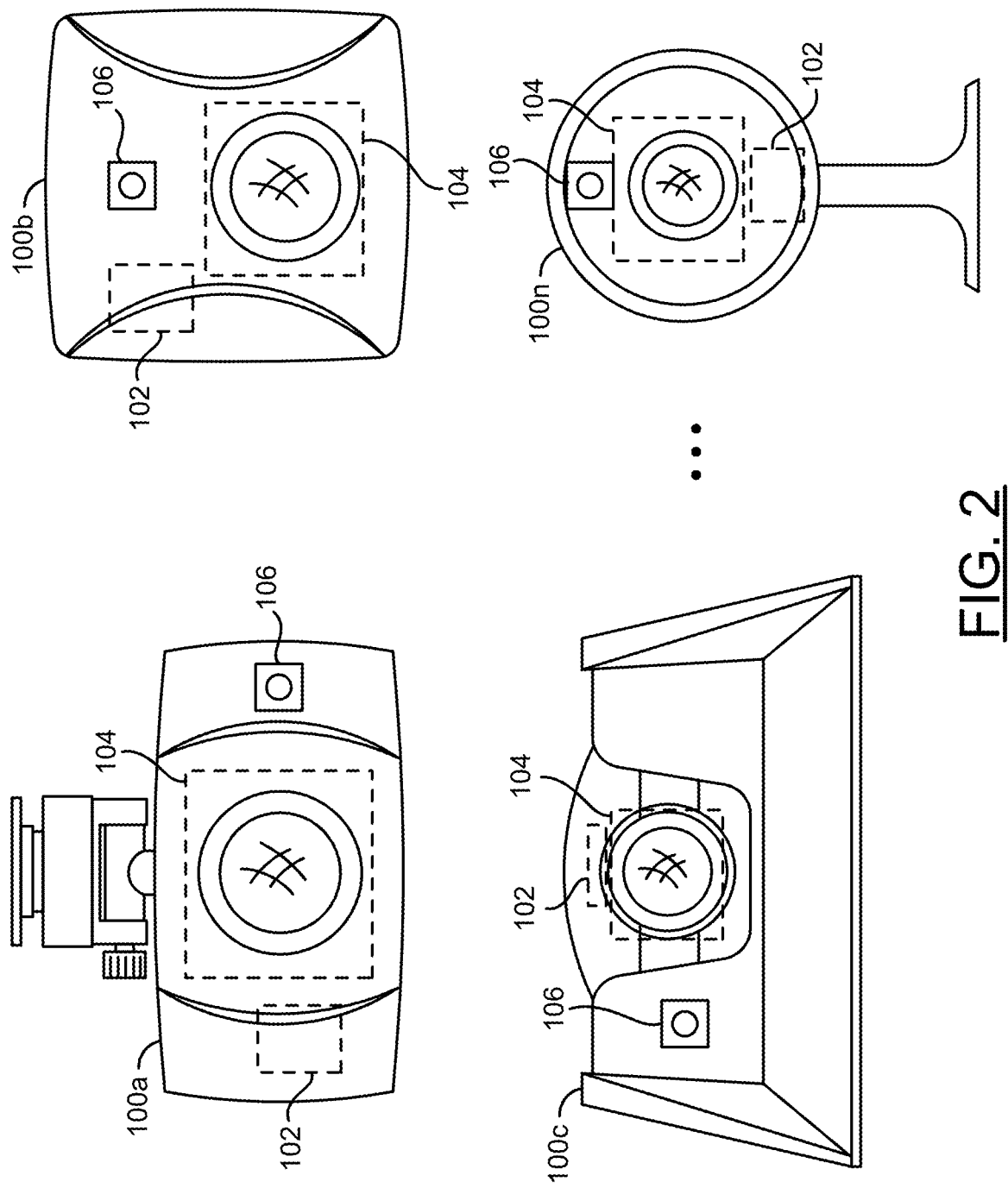
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement a structured light projector, a stereo camera, or a time-of-flight (ToF) sensor. The camera systems 100a-100n may comprise other components (not shown). Details of the components of the cameras 100a-100n may be described in association with FIG. 3.

The processor 102 may be configured to perform matrix calculations (e.g., dot product, matrix inversion, matrix tranposition, etc.). The processor 102 may be configured to implement an artificial neural network (ANN). In an example, the ANN may comprise a convolutional neural network (CNN). The processor 102 may be configured to implement a video encoder. The processor 102 may be configured to process pixel data arranged as video frames. The capture device 104 may be configured to capture pixel data that may be used by the processor 102 to generate video frames. When the circuit 106 implements a structured light projector, the structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern. When the circuit 106 implements a time-of-flight sensor, the time-of-flight sensor 106 may be configured to generate a depth map (e.g., a point cloud).

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n), which may operate independently from each other. For example, each of the cameras 100a-100n may individually analyze the pixel data captured and perform event/object detection locally. In some embodiments, the cameras 100a-100n may be configured as a network of cameras (e.g., security cameras that send video data to a central device such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras. The processor 102 may be further configured to accelerate an alignment of a high-resolution 2D image and a high-resolution depth map image utilizing low-bit-width floating-point representation.

Figure 3:
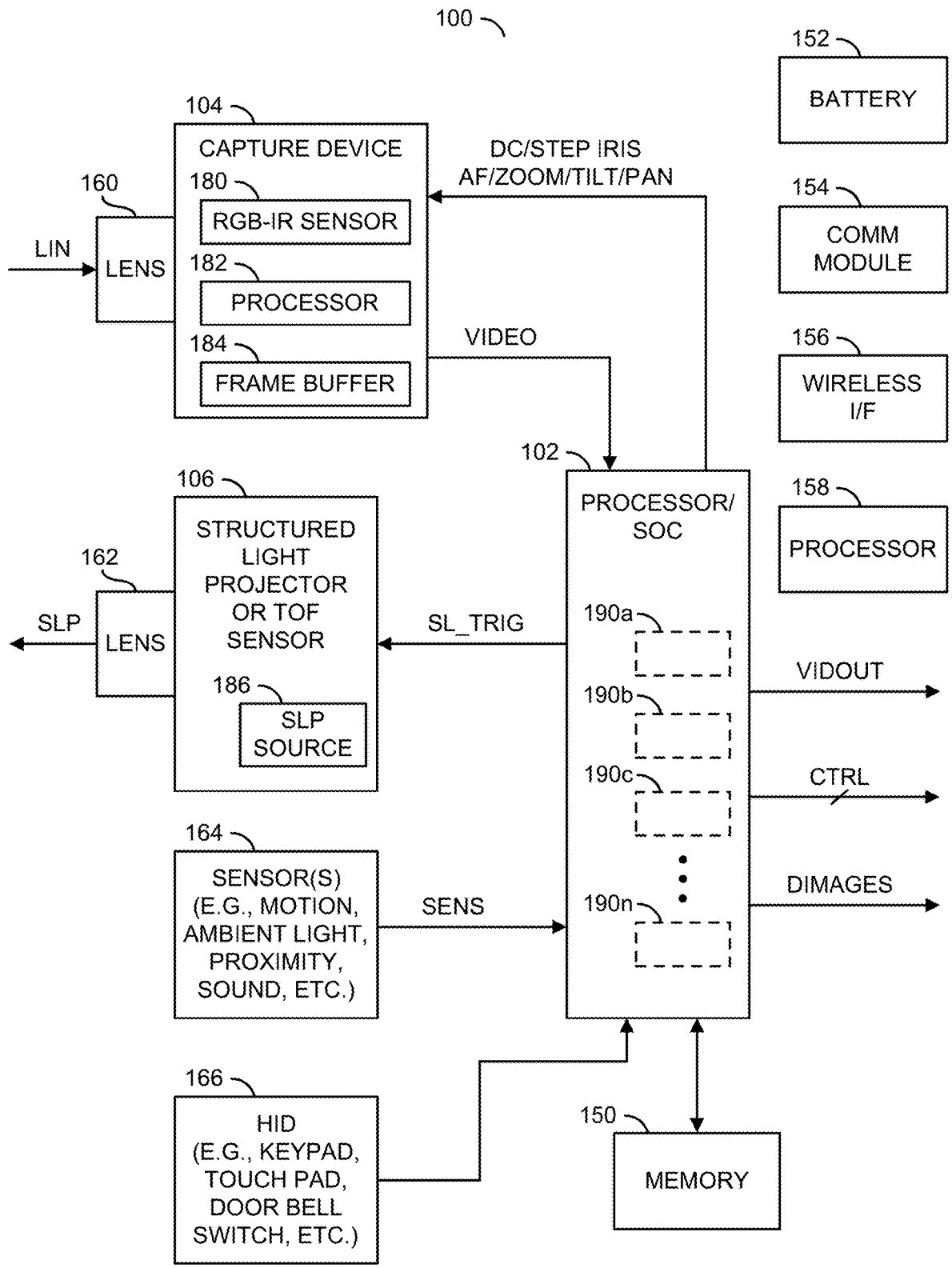
FIG. 3 is a diagram illustrating a block diagram of a camera system.

Referring to FIG. 3, a block diagram of the camera system 100 is shown illustrating an example implementation. In an example, the camera system 100 may comprise the processor/SoC 102, the capture device 104, and the structured light projector or time-of-flight sensor 106 as shown in association with FIG. 2. The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, etc.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, etc.) stored in the memory 150. In an example, the memory 150 may store one or more directed acyclic graphs (DAGs) and one or more sets of weights and biases defining the one or more artificial neural network models. In an example, the processor/SoC 102 may be configured to execute instructions implementing a process for accelerated alignment of high-resolution 2D and depth map images utilizing low-bit-width floating-point representation stored in the memory 150. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. A dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data, and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The processor 102 may be configured to generate the signal CTRL in response to sensor fusion operations (e.g., aggregating information received from disparate sources). The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

A multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
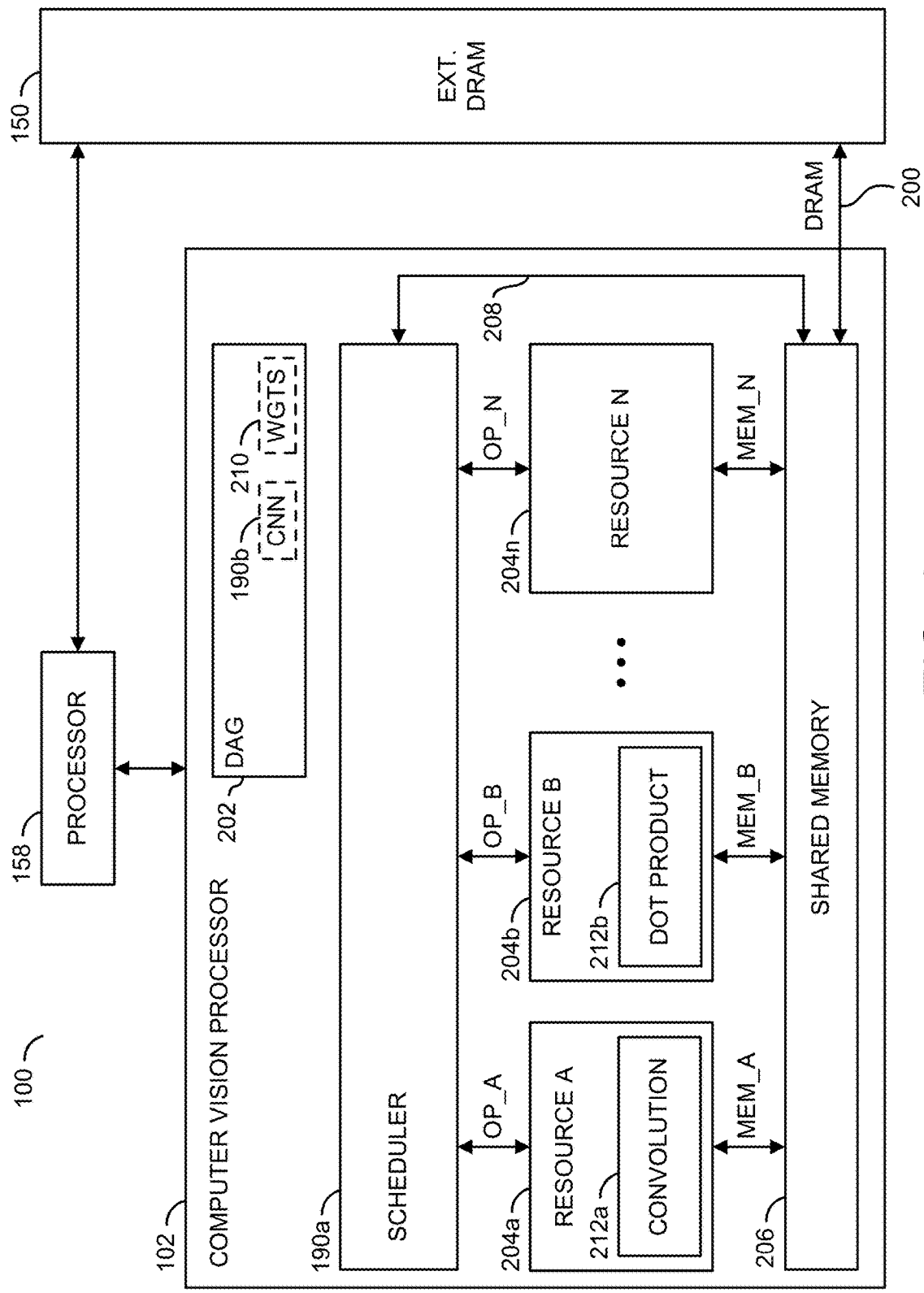
FIG. 4 is a diagram illustrating processing circuitry of a camera system implementing an accelerated alignment of high-resolution image and depth map for low-bit floating-point representation.

Referring to FIG. 4, a diagram illustrating processing circuitry of a camera system implementing a convolutional neural network and matrix calculations configured to perform 3D reconstruction and accelerated alignment of high-resolution 2D images and depth map images using a low-bit-width floating-point representation is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement asecond processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The circuit 190a may implement a scheduler circuit. The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
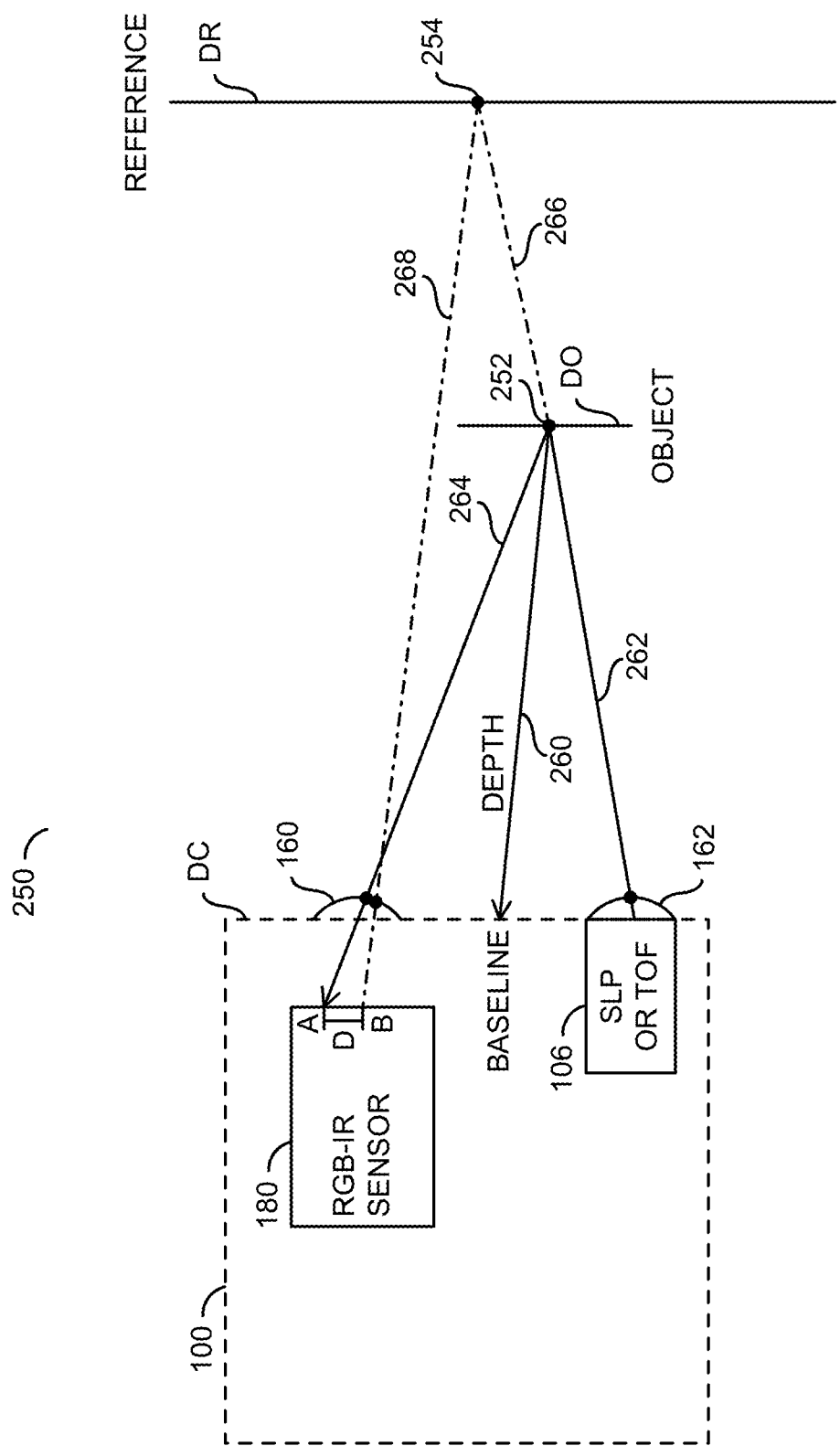
FIG. 5 is a diagram illustrating depth estimation using a camera system.

Referring to FIG. 5, a diagram illustrating monocular structured light depth estimation is shown. A scenario 250 is shown. The scenario 250 may comprise the camera device 100, an object 252 and a reference location 254. The structured light projector 106, the lens 160, the structured light pattern lens 162 and the image sensor 180 are shown. Other components of the camera device 100 have been omitted for clarity.

A location DC is shown at the camera device 100. The location DC may represent a baseline location of the lens 160 and the structured light pattern lens 162. A location DO is shown. The location DO may represent a distance of the object 252 from the baseline location DC of the camera device 100. In an example, the object 252 may be a distance of DO from the camera device 100. A location DR is shown. The location DR may represent a distance of the reference location 254 from the baseline location DC of the camera device 100. In an example, the reference location 254 may be a distance DR from the camera device 100.

The object 252 is shown at the distance DO from the baseline location DC. The object 252 may be located at the distance DO, which may be closer to the lens 160 than the reference location 254. For example, the object 252 may be at some distance DO in between the baseline location DC and the reference location DR. The object 252 is shown at some location in between the structured light projector lens 162 and the lens 160. For example, the object 252 is shown offset from both the structured light projector lens 162 and the lens 160. The object 252 may be representative of a person, an animal, a vehicle, an inanimate object (e.g., a curb, a road sign, a bicycle, tree, a box, etc.), etc. The type, size, shape, distance from the camera device 100 and/or distance from the reference location 254 of the object 252 may be varied according to the design criteria of a particular implementation.

The reference location 254 may be an example of content in a reference image. The reference location 254 may be some distance from the camera device 100 that is within the range of the structured light SLP that may be generated by the structured light projector 106. The reference location 254 may be used by the processor 102 as a basis of comparison for incoming video frames. In an example, new incoming video frames may be compared to reference video frames. The reference video frames may comprise images of the structured light pattern SLP at various distances (e.g., the reference location 254 may be one of the various distances for the reference images). The processor 102 may be configured to compare the new incoming video frames to the reference images to determine where the object 252 is located using computer vision operations and/or 3D reconstruction. The reference images may enable 3D reconstruction to be performed when the monocular lens 160 is implemented. While one reference location 254 is shown in the scenario 250, the processor 102 may be configured to capture multiple reference images of various reference locations at different distances to have a basis for comparison of the structured light pattern SLP. The number of the reference images stored and/or the various distances for the reference location may be varied according to the design criteria of a particular implementation.

A line 260 is shown. The line 260 may represent a baseline depth of the camera device 100 from the object 252. The line 260 may illustrate a depth direction. The CNN module 190b of the processor 102 may be configured to arrange reference images along the depth direction 260 shown. A line 262 is shown. The line 262 may represent the structured light pattern SLP generated by the structured light projector 106. The structured light pattern SLP is shown as the line 262 being projected onto the object 252. A line 264 is shown. The line 264 may represent the structured light pattern SLP captured by the image sensor 180 with respect to the object 252 and a depth direction of the object 252. A line 266 is shown. The line 266 may represent the structured light pattern SLP and generated by the structured light pattern for the reference image. The structured light pattern SLP is shown as the line 266 being projected onto the reference location 254 (e.g., captured when the object 252 is not present). For example, instead of being projected onto the object 252, when the object 252 is not present, the structured light pattern SLP may project beyond the distance DO and onto the reference location 254. A line 268 is shown. The light 268 may represent the structured light pattern SLP captured by the image sensor 180 with respect to the reference location 254 and a depth direction of the reference location 254.

When the object 252 is present, the structured light pattern SLP may be projected onto the object 252 (e.g., the line 262) and the image sensor 180 may capture the object 252 with the structured light pattern SLP (e.g., the line 264). The line 264 may illustrate that the structured light pattern SLP projected onto the object 252 may enter the lens 160 and be captured by the image sensor 180 at a location A. When the object 252 is not present, the structured light pattern SLP may be projected onto the reference location 254 (e.g., the line 266) and the image sensor 180 may capture the reference location 254 with the structured light pattern SLP (e.g., the line 268). The line 268 may illustrate that the structured light pattern SLP projected onto the reference location 254 may enter the lens 160 and be captured by the image sensor 180 at a location B.

A distance D is shown on the image sensor 180. The distance D may represent a distance between the location A (e.g., where the structured light pattern SLP was captured for the object 252) and the location B (e.g., where the structured light pattern SLP was captured for the reference location 254). The distance D may represent a disparity between the structured light pattern SLP for the distance DO of the object 252 and the distance DR for the reference location 254. The disparity amount D may be used by the processor 102 and/or the CNN module 190b to determine a depth estimation of the object 252 using a monocular structured light pattern.

A number and/or type of cameras may differ in various depth imaging devices consistent with the scope of this disclosure. In general, one or more cameras may be configured to provide video from which a time-resolved sequence of three-dimensional depth maps may be obtained via subsequent processing. As used herein, the term "depth map" refers to an array of pixels registered to corresponding regions of an imaged scene, with a depth value of each pixel indicating the distance between the camera and the surface imaged by the particular pixel.

In other embodiments, a stereo camera technique or a "time-of-flight" (ToF) sensor may be implemented to determine the depth estimation of the object 252. In an example, a depth imaging device may be implemented that may include right and left stereoscopic cameras. Time resolved images from both cameras may be registered to each other and combined to produce depth-resolved video. In another example, a ToF depth camera may be implemented that includes a light source configured to project a pulsed infrared illumination onto a scene. In an example, two cameras may be configured to detect the pulsed illumination reflected from the scene. In an example, the cameras may include an electronic shutter synchronized to the pulsed illumination, but the integration times for the cameras may differ, such that a pixel-resolved time-of-flight of the pulsed illumination, from the light source to the scene and then to the cameras, may be discernible from the relative amounts of light received in corresponding pixels of the two cameras.

In various applications, the monocular structured light depth estimation, the stereo vision depth estimation, or the time-of-flight depth estimation may be used to generate the high-resolution depth map images to be aligned with the high-resolution 2D images utilizing accelerated alignment of high-resolution image and depth map for low-bit-width floating-point representation in accordance with an embodiment of the invention.

Figure 6:
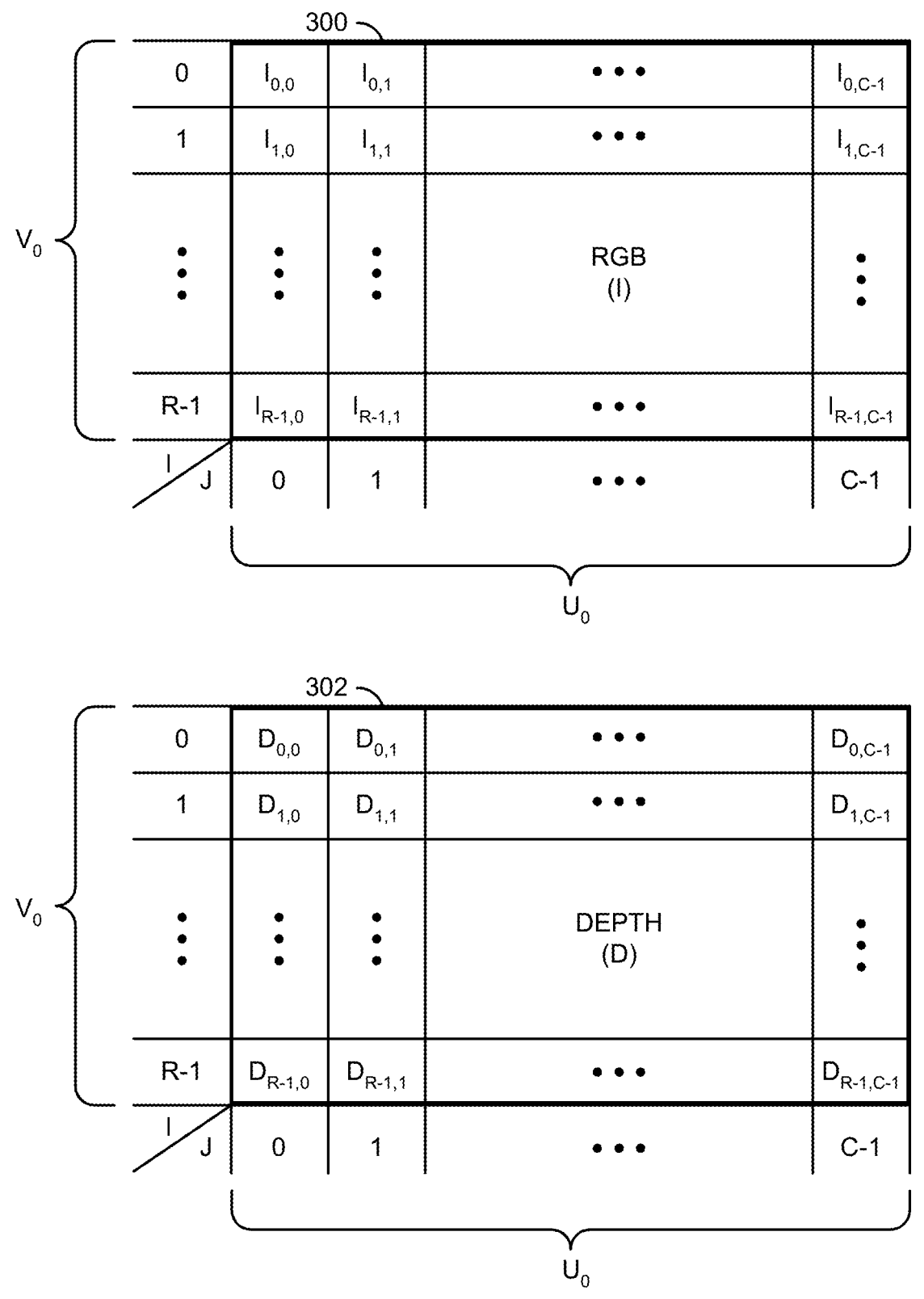

Referring to FIG. 6, a diagram is shown illustrating decomposition of high-resolution 2D and depth map images into sub-images, which may be used to calculate an alignment matrix using low-bit-width floating-point representation. In an example, a high-resolution 2D image I is illustrated by an array 300 and a depth map image D is illustrated by an array 302. The high-resolution 2D image I and the depth map image D may each be decomposed into a plurality of sub-images by dividing each of the arrays 300 and 302 into a plurality of component sub-arrays. The sub-images may be used to calculate an alignment matrix using low-bit-width floating-point representation and operations.

In order to solve depth alignment of high-resolution images in a low-bit-width floating-point operation platform, a depth alignment algorithm based on a combination of matrix decomposition, offset, and table look-up may be implemented. Floating point units (FPUs) may increase the range and precision of mathematical calculations or enable greater throughput in a shorter amount of time. FPUs may be used to make it easier to meet real-time constraints. An FPU may enable a system to complete calculations in less time and, as a result, spend more time in an idle (e.g., sleep) mode. By enabling systems to spend more time in the idle mode, a system with an FPU may save power and extend battery life. Floating-point numbers are generally represented in the form of $A \times Base^B$, where A is the mantissa and B is the exponent. The mantissa A generally represents the significant digits of the numbers. Depending on the exponent B, the mantissa may represent an integer or a fraction. In an example, a single-precision floating-point representation comprises 32 bits and may be arranged as in the following Table 1, with the most significant bit (MSB) on the left:

TABLE 1

| 31 | 30 23 | 22 0 |
|---|---|---|
| 1 | 11111111 | 1111111111111111111111 |
| Sign | Exponent | Mantissa |

The sign of a binary floating-point number is represented by a single bit. A 1 bit indicates a negative number, and a 0 bit indicates a positive number. A double-precision floating-point representation generally comprises 64 bits, 1 bit for the sign, 11 bits for the exponent, and 52 bits for the mantissa.

In an example, for a depth alignment problem on a binary signed floating-point operation platform with a sufficient number of precision bits and a mantissa of k bits, where k is greater than 2, the resolution of both the depth image D and the 2D image I may be $u_0 \times v_0$. In general, the number of precision bits A is considered sufficient when $2^A$ is greater than or equal to the particular variable range to be represented. In an example, for a variable value range from 0.0 to 1280.0 to be represented by a floating-point number, the number of precision bits (or mantissa) of the floating-point number should be equal to or greater than 11 bits (e.g., $2^{11} > 1280$). In another example, for a variable value of 320.1 to be described precisely enough by a floating-point number, the number of precision bits (or mantissa) of the floating-point number should be equal to or greater than 4 bits (e.g., $2^{-4} < 0.1$). In general, the more precise a result is to be, the greater the number of precision (or mantissa) bits needed.

In an example, the camera internal parameters corresponding to the high-resolution depth image D may comprise a focal length, $f_{Dx}$, $f_{Dy}$, and a principal point offset, $c_{Dx}$, $c_{Dy}$. In an example, the camera internal parameters corresponding to the high-resolution 2D image I may be the focal length, $f_{Ix}$, $f_{Iy}$, and the principal point offset, $c_{Ix}$, and $c_{Iy}$. In an example, the camera projection matrix of the camera may be $T (T \in R^{4 \times 4})$ and the range of depth in the high-resolution depth image D may be $d \in (d_{min}, d_{mzx})$, where $d_{min}$ is greater than 1. Assuming that the depth camera and the 2D camera are close enough and the included angle is small enough, the specific implementation steps may be implemented as follows.

In a first step, a value l may be calculated as $l = 2^{k-1}$. The value l may be used to equally divide the depth image D and the 2D image I into r rows and c columns, for a total of r×c component images (sub-images), where $$r = \left\lceil \frac{v_0}{l} \right\rceil \text{ and } c = \left\lceil \frac{u_0}{l} \right\rceil, \quad \text{EQS. 1 and 2}$$

and where $\lceil \ \rceil$ represents rounding up. For each of the r×c sub-images, the sub-images in the i-th row and j-th column (i=0, ..., r−1, j=0, ..., c−1) may be designated as $D_{ij}$ and $I_{ij}$, and the respective width $u_{ij}$ and height $v_{ij}$ may be calculated according to the following equations:

$$u_{ij} = \text{round}\left(\frac{(j+1) \cdot u_0}{c}\right) \text{ and } v_{iv} = \text{round}\left(\frac{(i+1) \cdot v_0}{r}\right), \quad \text{EQS. 3 and 4}$$

respectively.

In a next step, for each pair of sub-images $D_{ij}$, $I_{ij}$, an intrinsic matrix of the camera for each of the sub-images may be calculated as follows:

$$\begin{cases} K_{Dij} = \begin{bmatrix} f_{Dx} & 0 & c_{Dx} - \left(\text{round}\left(\frac{(j+1) \cdot u_0}{c}\right) + \frac{u_0}{2c}\right) & 0 \\ 0 & f_{Dy} & c_{Dy} - \left(\text{round}\left(\frac{(i+1) \cdot v_0}{r}\right) + \frac{r_0}{2r}\right) & 0 \\ 0 & 0 & 1 & 0 \\ 0 & 0 & 0 & 0 \end{bmatrix} \\ K_{Iij} = \begin{bmatrix} f_{Ix} & 0 & c_{Ix} - \left(\text{round}\left(\frac{(j+1) \cdot u_0}{c}\right) + \frac{u_0}{2c}\right) & 0 \\ 0 & f_{Iy} & c_{Iy} - \left(\text{round}\left(\frac{(i+1) \cdot v_0}{r}\right) + \frac{r_0}{2r}\right) & 0 \\ 0 & 0 & 1 & 0 \\ 0 & 0 & 0 & 0 \end{bmatrix} \end{cases} \quad \text{EQS. 5 and 6}$$

An intermediate matrix $A_{ij}$ ($A_{ij} \in R^{4 \times 4}$) may be calculated as follows:

$$A_{ij} = \begin{bmatrix} k_b & 0 & 0 & 0 \\ 0 & k_b & 0 & 0 \\ 0 & 0 & k_b & 0 \\ 0 & 0 & 0 & 1 \end{bmatrix} \cdot K_{Iij} \cdot T \cdot K_{Iij}^{-1}, \quad \text{EQ. 7}$$

where $k_b = \min(8, d_{min})$. Then the first three lines of the intermediate matrix $A_{ij}$ ($A_{ij} \in R^{4 \times 4}$) may be taken and recorded as the disparity-to-depth matrix $Q_{ij}$ ($Q_{ij} \in R^{3 \times 4}$) for each pair of sub-images $D_{ij}$, $I_{ij}$. In a third step, a new depth image may be obtained.

In a fourth step, projection matrices $p_{Dij}$ and $p_{Iij}$ for the depth map sub-images $D_{ij}$ and the 2D sub-images $I_{ij}$, respectively, may be generated. For each depth map sub-image $D_{ij}$, for each pixel($u_{Dij}$, $v_{Dij}$), and the corresponding depth value on the pixel, tensors for the projection matrices $P_{Dij}$ and $p_{Iij}$ may be generated according to the following equations:

$$p_{Dij} = \begin{bmatrix} u_{Dij} & v_{Dij} & 1 & \frac{k_b}{d_{u_{Dij} v_{Dij}}} \end{bmatrix}^T, \quad \text{EQ. 8}$$

$$p_{Iij} = Q_{ij} \cdot p_{Dij} = [x_{Iij} \ y_{Iij} \ z_{Iij}]^T. \quad \text{EQ. 9}$$

In a fifth step, depth values for each pixel of each 2D sub-image $I_{ij}$ may be calculated using the following equation:

$$u_{Iij} = \text{round}\left(\frac{x_{Iij}}{z_{Iij}}\right), v_{Iij} = \text{round}\left(\frac{y_{Iij}}{z_{Iij}}\right), \quad \text{EQ. 10}$$

$$d_{u_{Iij} v_{Iij}} = z_{Iij} \div k_b \cdot d_{u_{Dij} v_{Dij}}.$$

Then, in the high-resolution 2D image I, the depth value to assign to each pixel $(u_I, v_I)$ may be determined by lookup in the corresponding 2D sub-images as follows:

$$(u_I, v_I) = (u_{Iij} + j \times u_{ij}, v_{Iij} + i \times v_{ij}) \text{ and}$$

the depth value is $d_I = d_{u_{ij} v_{ij}}$.

If there are further depth images, the process may then return to the third step. If there is no new depth image, the algorithm may be terminated.

Figure 7:
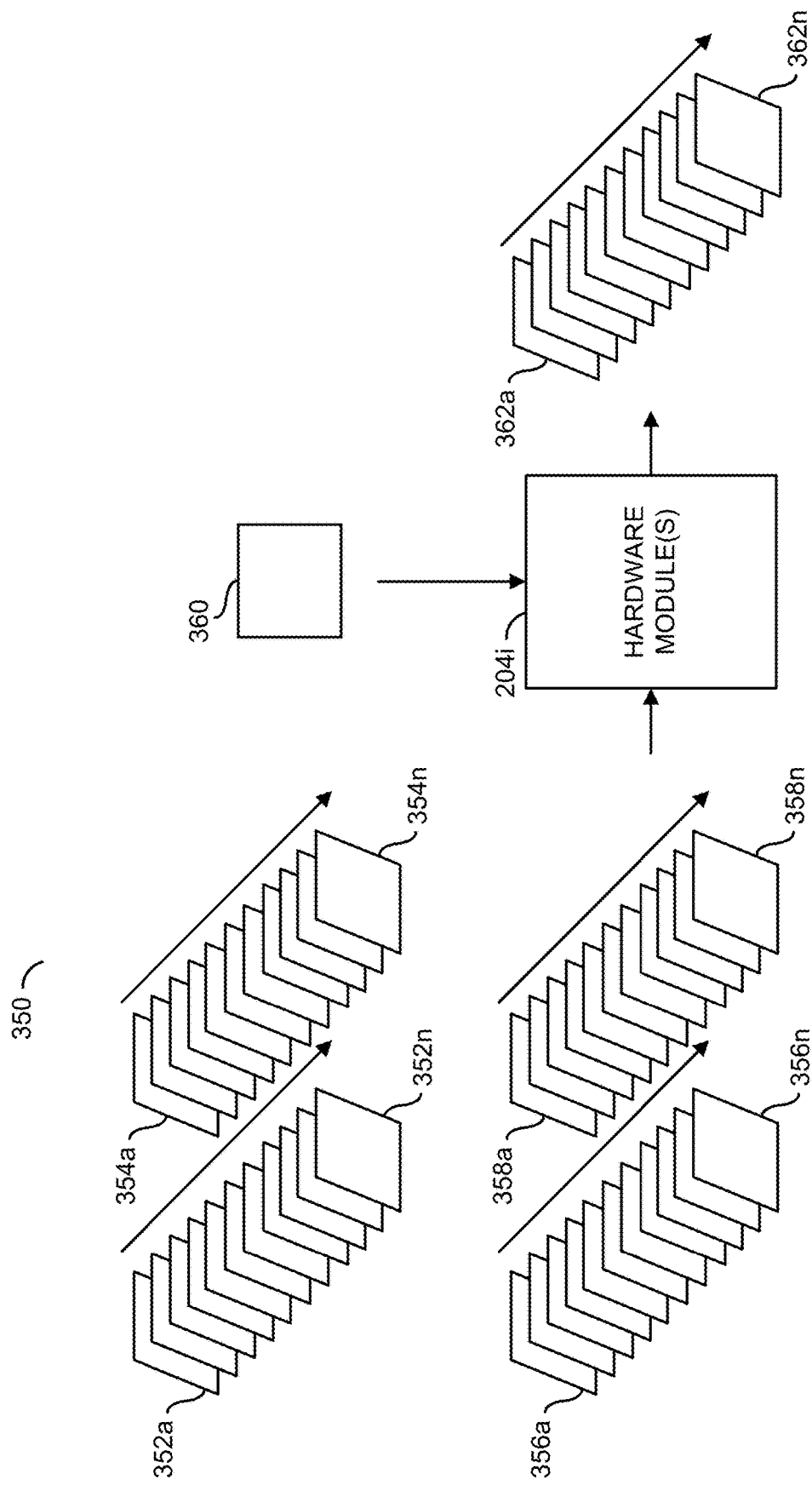
FIG. 7 is a diagram illustrating a data arrangement for calculating an alignment matrix using low-bit-width floating-point representation.

Referring to FIG. 7, a diagram illustrating a data arrangement for calculating an alignment matrix using low-bit-width floating-point representation is shown. A data arrangement 350 is shown. The processor 102 may be configured to perform the data arrangement 350 in order to implement an accelerated alignment of high-resolution 2D images and high-resolution depth map images using a low-bit-width floating-point representation. The alignment technique may be implemented in order to perform 3D reconstruction locally on the processor 102 (e.g., perform all the processing on the edge device 100 without uploading data to cloud computing resources to perform the analysis) and/or using a processor implementing low-bit-width floating-point operations.

The data arrangement 350 may be performed by the processor 102 and/or the CNN module 190b. The data arrangement 350 may be performed offline (e.g., during offline alignment) or in real time. In an example, the images may be acquired and preprocessed before the pixel data for the input video images are generated by the capture device 104 and arranged as video frames by the processor 102. The processor 102 and/or the CNN module 190b may be configured to arrange the image data obtained after collection of the images and preprocessing.

In the data arrangement 350, 2D sub-images 352a-352n and depth map sub-images 354a-354n are shown. To perform the data arrangement 350, the processor 102 and/or the CNN module 190b may be configured to perform matrix decomposition offset to ensure each of the decomposed images 352a-352n and 354a-354n may be represented by a low-bit-width representation without loss of accuracy. The dedicated hardware modules 204a-204n may be configured to decompose the high-resolution 2D image I to generate the sub-images 352a-352n and the high-resolution depth map image D to generate the sub-images 354a-354n. For example, the decomposition may be performed according to the number of bits in the mantissa of the low-bit-width floating-point representation of the processor 102.

In the data arrangement 350, intrinsic matrices of the camera 356a-356n and 358a-358n are shown for each 2D sub-image and each depth sub-image, respectively. To perform the data arrangement 350, the processor 102 and/or the CNN module 190b may be configured to perform matrix decomposition offset to ensure each of the decomposed images 352a-352n and 354a-354n may be utilized in low-bit-width operations without loss of accuracy. The processor 102 and/or the CNN module 190b may be configured to use the dedicated hardware modules 204a-204n to calculate the intrinsic matrices of the camera 356a-356n and 358a-358n according to Equations 5 and 6 above.

In the data arrangement 350, the projection matrix of the camera 360 and Q matrices 362a-362n are also shown. The processor 102 and/or the CNN module 190b may be configured to use the dedicated hardware modules 204a-204n to calculate the Q matrices 362a-362n using the intrinsic matrices of the camera 356a-356n and 358a-358n, the projection matrix of the camera 360, and Equation 7 above. When the data arrangement 350 has been generated, the processor 102 and/or the CNN module 190b may perform the accelerated alignment of high-resolution 2D images and high-resolution depth map images using a low-bit-width floating-point representation. In an example, the processor 102 and/or the CNN module 190b may perform the accelerated alignment of high-resolution 2D images and high-resolution depth map images by applying Equations 8, 9, and 10 above to obtain depth values for each of the pixels of the high-resolution 2D images.

Figure 8:
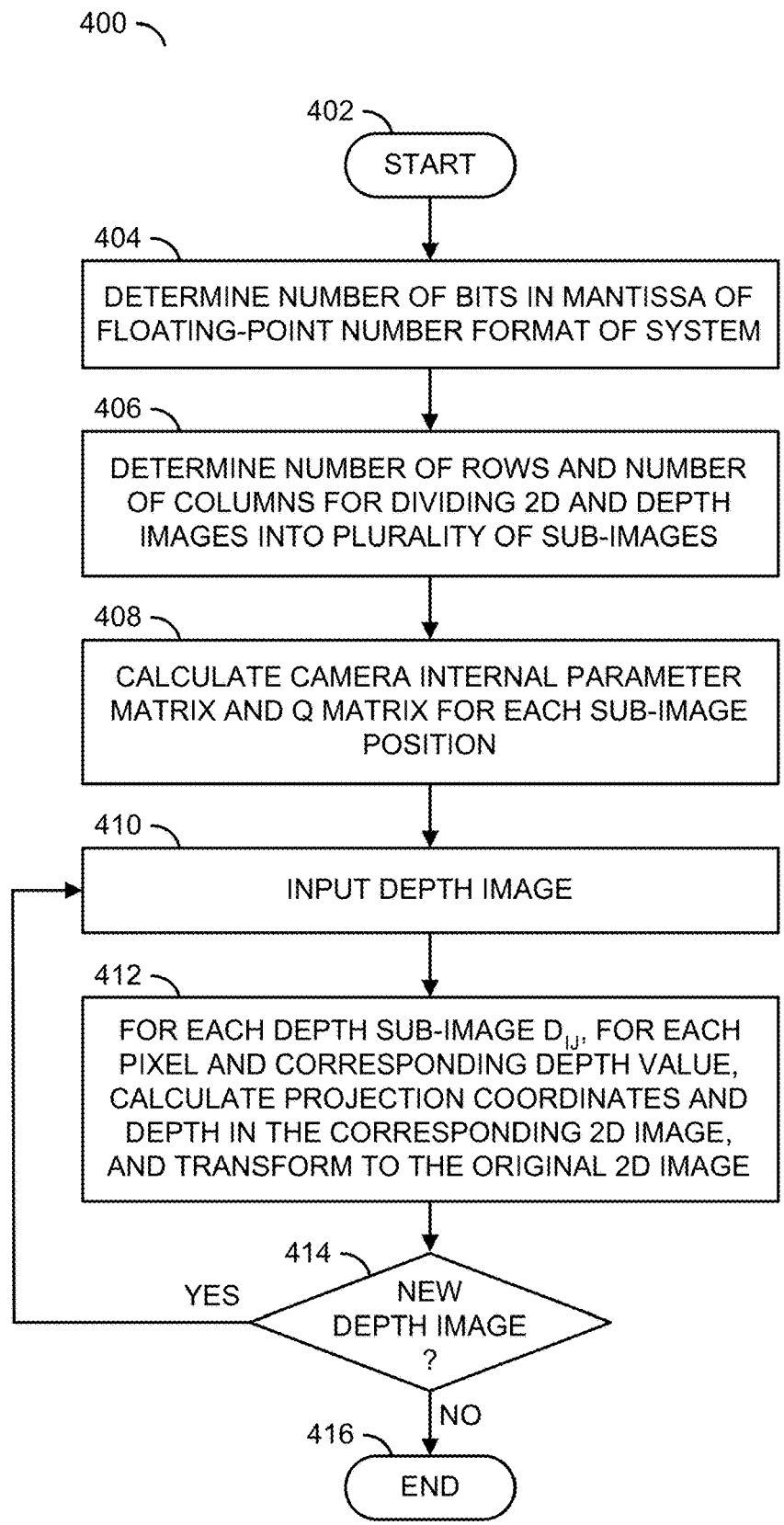
FIG. 8 is a flow diagram illustrating a method for accelerating alignment of a high-resolution 2D image and a high-resolution depth map image for low-bit-width floating-point representation.

Referring to FIG. 8, a flow diagram illustrating a method (or process) 400 is shown. The method 400 may be implemented to accelerate alignment of a high-resolution 2D image and a high-resolution depth map image using a low-bit-width floating-point representation. Floating-point representation allows the use of a floating point unit (FPU) to perform calculations. Floating point units may increase a range and precision of mathematical calculations and/or enable increased throughput in less time. The increased throughput and reduced time generally make meeting real-time constraints easier. Also, by enabling a system to complete calculations in less time, power costs may be reduced allowing low power operation and extended battery life. The method 400 generally comprises a step (or state) 402, a step (or state) 404, a step (or state) 406, a step (or state) 408, a decision step (or state) 410, a step (or state) 412, a step (or state) 414, and a step (or state) 416.

The method 400 generally starts in the step 402 and moves to the step 404. In the step 404, the method 400 may determine a number of bits in the mantissa of a floating-point number format of a camera system. In the step 406, the method 400 may determine a number of rows (e.g., r) and a number of columns (e.g., c) for dividing a high-resolution 2D image and a high-resolution depth map image into respective pluralities of decomposed (or sub-) images, which may be arranged as an array of r×c sub-images. In the step 408, the method 400 may calculate a respective camera internal parameter matrix and a respective Q matrix for each sub-image position. In the step 410, the method 400 may input a high-resolution depth image and move to the step 412.

In the step 412, the method 400 may calculate the projection coordinates and depth in the corresponding high-resolution 2D image for each depth map sub-image Dij and for each depth. The method 400 may then transform the high-resolution depth map image for alignment with the original high-resolution 2D image. In the step 414, the method 400 may determine whether a new depth image is available. When there is a new depth image, the method 400 may move to the step 410. When there is no new depth image, the method 400 may move to he step 416 and terminate.

In various embodiments the alignment matrix of several uniform small images may be solved by matrix decomposition and offset, so that the accuracy of alignment of a high-resolution 2D image and a high-resolution depth image using a low-bit-width floating-point representation may be maintained. After each small resolution image is obtained by decomposing the large resolution image, the corresponding coordinate transformation may be carried out for each small resolution image. In an example using 1280×960 RGB and depth map images, an alignment process in accordance with an embodiment of the invention may obtain 16 equal parts (or sub-images) of 320×240 pixels, a 3×3 internal parameter matrix of the 2D image generation equipment, a 3×3 internal parameter matrix of the depth image generation equipment, an offset of the 2D RGB image relative to depth map image generation equipment, and a 4×4 rotation matrix to realize matrix decomposition offset to adapt to the small resolution to improve accuracy. Finally, an aligned depth image may be generated.

In an example, a point cloud may be generated from an original depth image captured by a depth sensor. The point cloud may be re-projected to a corresponding RGB image. For each position (u, v) and depth of each point in the point cloud, a corresponding position (u, v) and depth in the RGB image may be obtained. An aligned depth image may be generated by gathering the position (u, v) and depth of each point in the point cloud in the aligned depth image.

In an example, an array may be created for storing a blank depth image. For each point in the point cloud, the depth of each point may be assigned to the pixel (u, v) in the array of the blank depth image. In an example, the depth of each point in the array of the blank depth image may be determined by looking up the depth of the corresponding point in a respective aligned depth sub-image. When the depths of all the points of the point cloud have been assigned to a pixel of the blank depth image, the blank depth image becomes the aligned depth image.

Figure 9:
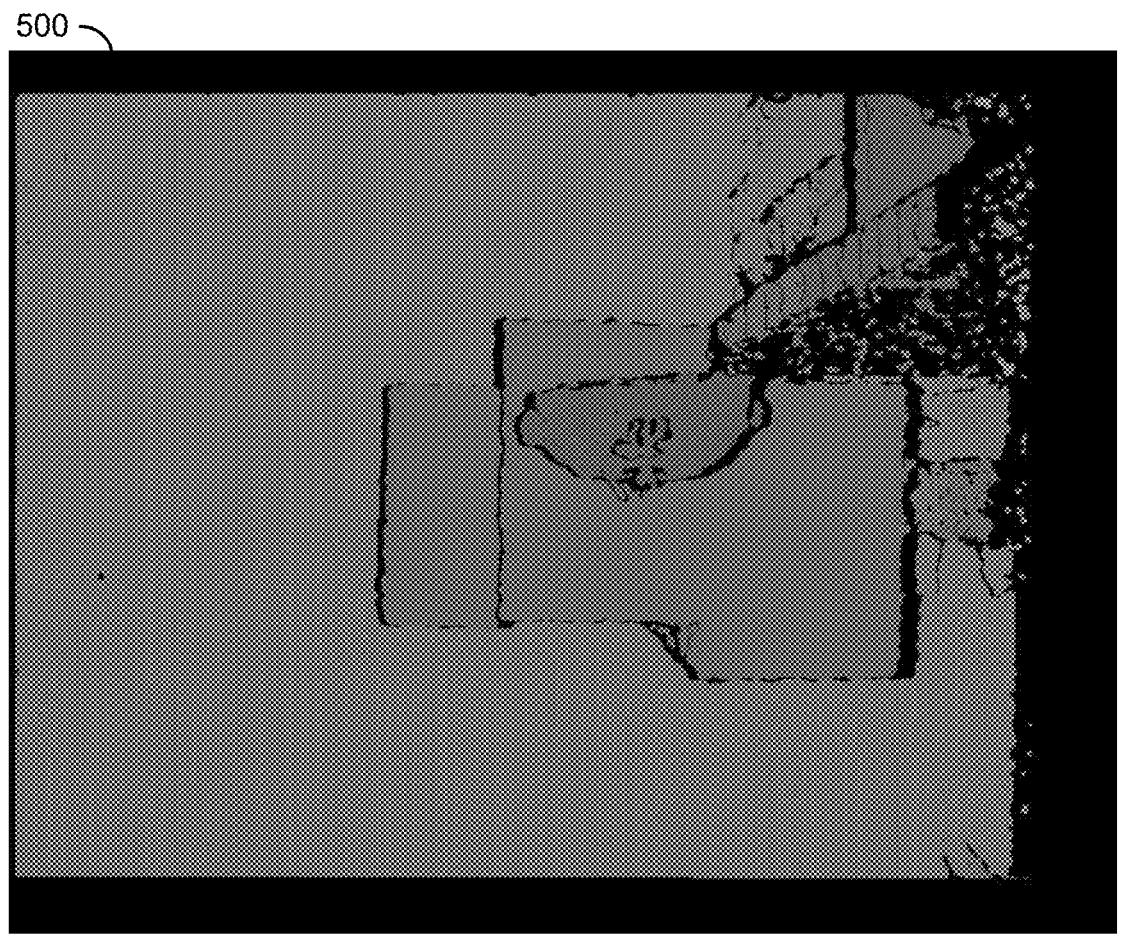
FIG. 9 is an image illustrating an example of an alignment result obtained using double-precision floating-point operations.

Referring to FIG. 9, an image 500 is shown illustrating an example of an aligned result obtained by double-precision floating-point operations. For a 1280×960 depth image, the aligned result obtained by double-precision floating-point operations may be used as a reference value. The accuracy and speed of data using double-precision floating-point operations at a resolution of 1280×960 may be considered to be the ground truth result of the depth alignment operation.

Figure 10:
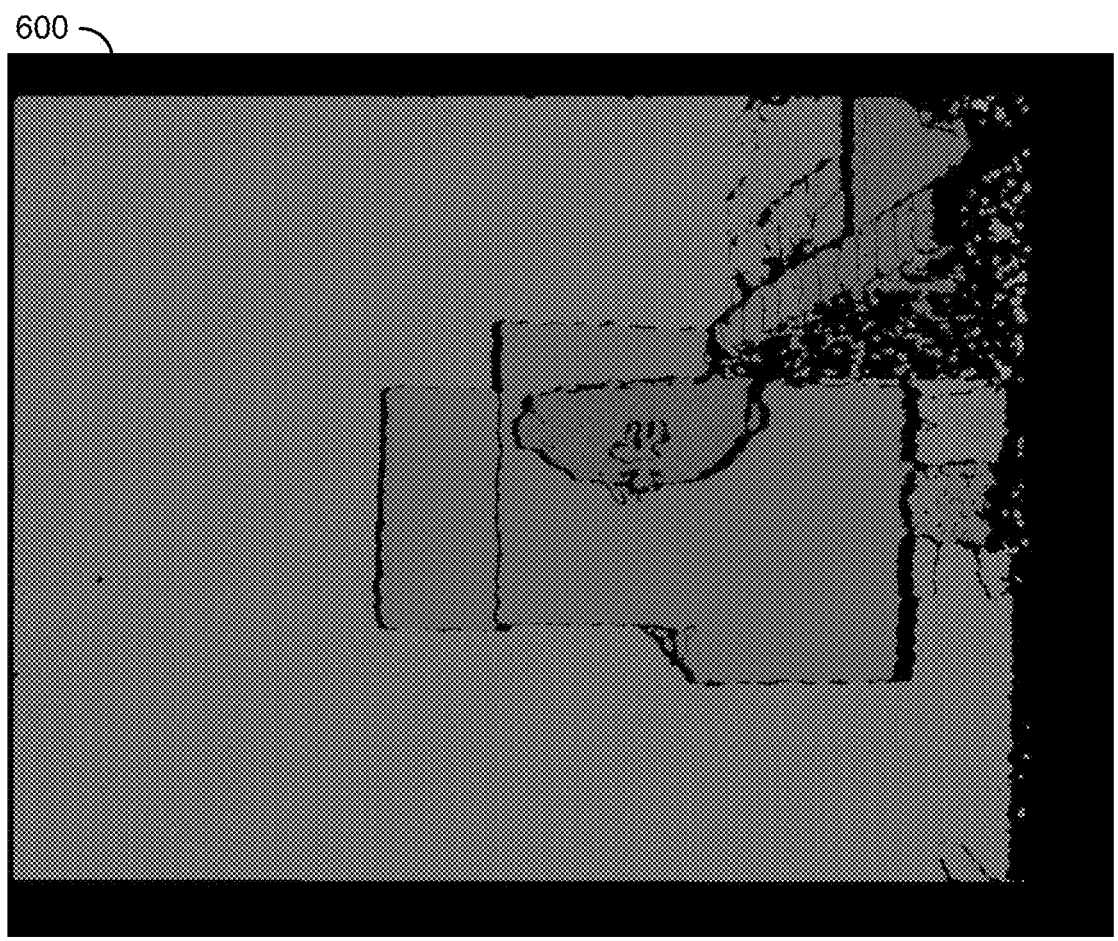
FIG. 10 is an image illustrating an example of an alignment result obtained using single-precision floating-point operations.

Referring to FIG. 10, an image 600 is shown illustrating an example of an aligned result obtained by single-precision floating-point operations. For a 1280×960 depth image, the aligned result obtained by single-precision floating-point operations may be as illustrated by the image 600. The accuracy and speed of data alignment using single-precision floating-point operations at the resolution of 1280×960 may be summarized in the following Table 1:

TABLE 1

| Dimension | Average_Error | Max_Error | Min_Error |
|---|---|---|---|
| $u_I$ | 6.1e−05 pixel | 1 pixel | 0 pixel |
| $v_I$ | 1.8e−05 pixel | 1 pixel | 0 pixel |
| $d_I$ | 8.0e−05 mm | 1 mm | 0 mm |

The time cost is 100 ms/frame.

Figure 11:
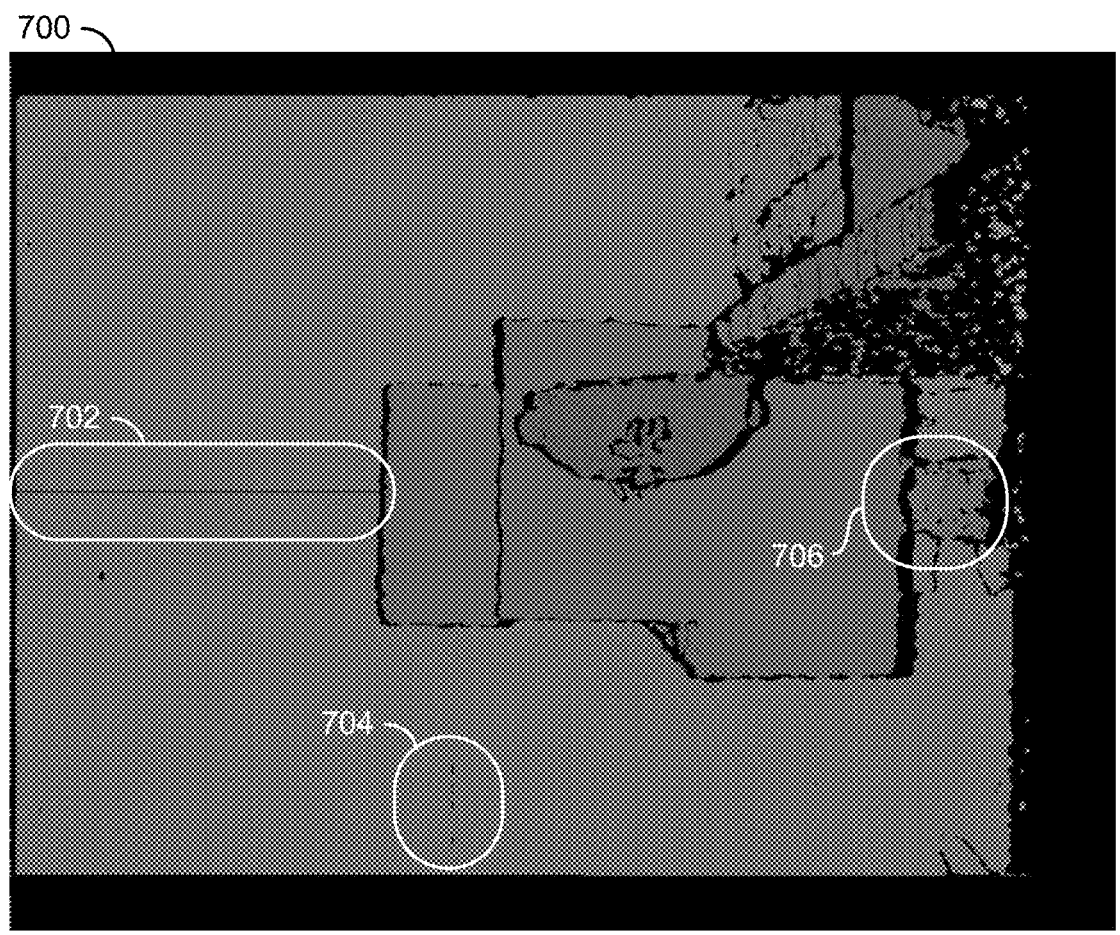
FIG. 11 is an image illustrating an example of an alignment result obtained without using a low-bit-width representation based on matrix decomposition offset and look-up table combination and using half-precision floating-point operations.

Referring to FIG. 11, an image 700 is shown illustrating another example of an aligned result with using an image splitting technique in accordance with an embodiment of the invention. When an accelerated alignment of a high-resolution 2D image and a high-resolution depth map image is implemented without low-bit-width floating-point representation based on matrix decomposition offset and table look-up combination, the accuracy and speed of the data operations using half-precision floating-point operations at a resolution of 1280×960 may be summarized in the following Table 2:

TABLE 2

| Dimension | Average_Error | Max_Error | Min_Error |
|---|---|---|---|
| $u_I$ | 0.543 pixel | 4 pixel | 0 pixel |
| $v_I$ | 0.370 pixel | 2 pixel | 0 pixel |
| $d_I$ | 0.931 mm | 7 mm | 0 mm |

The time cost is 16 ms/frame.

It can be observed in the result of the depth alignment without matrix decomposition offset and table look-up combination technique illustrated by image 700, that the result includes gaps (e.g., illustrated by blocks 702 and 704) and textures are blurred (e.g., illustrated by block 706).

Figure 12:
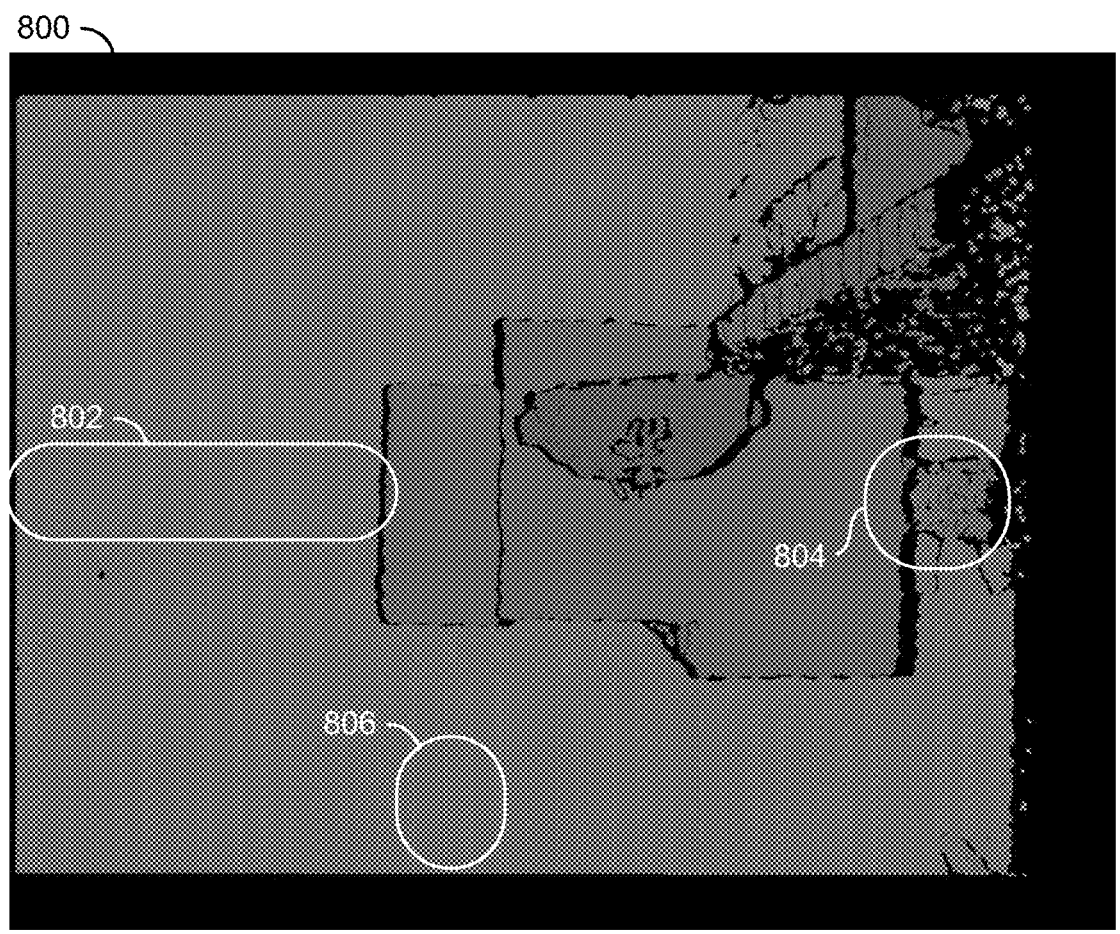
FIG. 12 is an image illustrating an example of an alignment result obtained using a low-bit-width representation based on matrix decomposition offset and look-up table combination and using half-precision floating-point operations.

Referring to FIG. 12, an image 800 is shown illustrating an example of an aligned result using low-bit-width floating-point representation based on matrix decomposition offset and look-up table combination in accordance with an embodiment of the invention. When an accelerated alignment of a high-resolution 2D image and a high-resolution depth map image is implemented using low-bit-width floating-point representation based on matrix decomposition offset and look-up table combination, the accuracy and speed of the data operations using half-precision floating-point operations at a resolution of 1280×960 may be summarized in the following Table 3:

TABLE 3

| Dimension | Average_Error | Max_Error | Min_Error |
|---|---|---|---|
| $u_I$ | 0.0345 pixel | 1 pixel | 0 pixel |
| $v_I$ | 0.0289 pixel | 1 pixel | 0 pixel |
| $d_I$ | 0.380 mm | 2 mm | 0 mm |

The time cost is 26 ms/frame.

It can be observed in the image 800 that the result of the depth alignment with matrix decomposition offset and table look-up combination is improved (e.g., illustrated by blocks 802, 804, and 806). It can be seen from the error statistical results above that the method in accordance with embodiments of the invention can effectively reduce errors when using half-precision floating-point operations, compared to methods that do not use low-bit-width floating-point representation based on matrix decomposition offset and look-up table combination. It can also be seen that the reduced errors are obtained while still providing increased speed relative to single and double precision operations.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data; and
   a processor configured to (i) process the pixel data arranged as video frames, (ii) decompose each of said video frames comprising a high-resolution two-dimensional (2D) image into a plurality of 2D sub-images using a decomposition offset, (iii) decompose each of said video frames comprising a high-resolution depth map image into a plurality of depth map sub-images using the decomposition offset, (iv) calculate a respective alignment matrix for each of the plurality of 2D sub-images and a corresponding one of the plurality of depth map sub-images using the decomposition offset, (v) perform matrix operations on the plurality of 2D sub-images and the plurality of depth map sub-images using the respective alignment matrices to obtain a plurality of aligned 2D sub-images and a plurality of aligned depth map sub-images, (vi) determine projection coordinates and depth values of the plurality of aligned 2D sub-images and the plurality of aligned depth map sub-images based on the high-resolution 2D image, and (vii) generate an aligned high-resolution depth map using the projection coordinates and the depth values, wherein
   (a) said video frames have a pixel coordinate value greater than a number of bits supported by a floating-point operator of said processor, and
   (b) a size of said plurality of 2D sub-images and said plurality of depth map sub-images is determined based on said floating-point operator of said processor.

2. The apparatus according to claim 1, wherein said decomposition offset is configured to ensure that each of said plurality of 2D sub-images and said plurality of depth map sub-images is represented as a low-bit-width floating-point representation without a loss of accuracy.

3. The apparatus according to claim 2, wherein said processor is configured to calculate the decomposition offset based on a number of bits of a mantissa of the low-bit-width floating-point representation.

4. The apparatus according to claim 1, wherein said high-resolution two-dimensional (2D) image and said high-resolution depth map image are divided into a plurality of rows and columns of sub-images based on the decomposition offset.

5. The apparatus according to claim 1, wherein said processor is further configured to calculate a respective camera matrix for each of the plurality of 2D sub-images and each of the plurality of depth map sub-images.

6. The apparatus according to claim 5, wherein said processor is further configured to calculate a respective intermediate matrix for each of the plurality of 2D sub-images and the corresponding one of the plurality of depth map sub-images using the respective camera matrix for each corresponding 2D sub-image of the plurality of 2D sub-images, the respective camera matrix for each corresponding depth map sub-image of the plurality of depth map sub-images, and a camera projection matrix of the apparatus.

7. The apparatus according to claim 6, wherein said processor is further configured to calculate a respective disparity-to-depth matrix for each of the plurality of 2D sub-images and the corresponding one of the plurality of depth map sub-images using the respective intermediate matrix.

8. The apparatus according to claim 7, wherein said processor is further configured to generate an aligned high resolution depth map for the high resolution 2D image using the respective disparity-to-depth matrices for the plurality of 2D sub-images and the corresponding ones of the plurality of depth map sub-images.

9. The apparatus according to claim 1, wherein said processor comprises a plurality of hardware engines configured to perform said matrix operations.

10. The apparatus according to claim 1, wherein said processor comprises a system-on-chip.

11. A method for accelerated alignment of 2D images and depth images using a low-bit-width floating-point representation comprising:
receiving pixel data;
processing the pixel data arranged as video frames;
decomposing each of said video frames comprising a high-resolution two-dimensional (2D) image into a plurality of 2D sub-images using a decomposition offset;
decomposing each of said video frames comprising a high-resolution depth map image into a plurality of depth map sub-images using the decomposition offset;
calculating a respective alignment matrix for each of the plurality of 2D sub-images and a corresponding one of the plurality of depth map sub-images using the decomposition offset;
performing matrix operations on the plurality of 2D sub-images and the plurality of depth map sub-images using the respective alignment matrices to obtain a plurality of aligned 2D sub-images and a plurality of aligned depth map sub-images;
determining projection coordinates and depth values of the plurality of aligned 2D sub-images and the plurality of aligned depth map sub-images based on the high-resolution 2D image; and
generating an aligned high-resolution depth map using the projection coordinates and the depth values, wherein (a) said video frames have a pixel coordinate value greater than a number of bits supported by a floating-point operator of a processor circuit and (b) a size of said plurality of 2D sub-images and said plurality of depth map sub-images is determined based on said floating-point operator of said processor circuit.

12. The method according to claim 11, wherein said decomposition offset is configured to ensure that each of said plurality of 2D sub-images and said plurality of depth map sub-images is represented as a low-bit-width floating-point representation without a loss of accuracy.

13. The method according to claim 12, further comprising calculating the decomposition offset based on a number of bits of a mantissa of the low-bit-width floating-point representation.

14. The method according to claim 11, wherein said high-resolution two-dimensional (2D) image and said high-resolution depth map image are divided into a plurality of rows and columns of sub-images based on the decomposition offset.

15. The method according to claim 11, further comprising calculating a respective camera matrix for each of the plurality of 2D sub-images and each of the plurality of depth map sub-images.

16. The method according to claim 15, further comprising calculating a respective intermediate matrix for each of the plurality of 2D sub-images and the corresponding one of the plurality of depth map sub-images using the respective camera matrix for each corresponding 2D sub-image, the respective camera matrix for each corresponding depth map sub-image, and a camera projection matrix.

17. The method according to claim 16, further comprising calculating a respective disparity-to-depth matrix for each of the plurality of 2D sub-images and the corresponding one of the plurality of depth map sub-images using the respective intermediate matrix.

18. The method according to claim 17, further comprising generating an aligned high resolution depth map for the high resolution 2D image using the respective disparity-to-depth matrices for each of the plurality of 2D sub-images and the corresponding one of the plurality of depth map sub-images.

19. The method according to claim 11, further comprising utilizing a plurality of hardware engines of said processor circuit to perform said matrix operations.

20. The method according to claim 19, wherein said processor circuit is part of an edge device.

* * * * *